DATA PROCESSING UNIT FOR PROVIDING SEQUENTIAL MEMORY ACCESS AND RECORD THEREOF

Filed May 4, 1964

INVENTORS
J. F. COULEUR
P. F. GUDENSCHWAGER
W. A. SHELLY
D. L. BAHRS
BY
ATTORNEY

Patented Oct. 14, 1969

3,473,154

DATA PROCESSING UNIT FOR PROVIDING SEQUENTIAL MEMORY ACCESS AND RECORD THEREOF

John F. Couleur, Philip F. Gudenschwager, and William A. Shelly, Phoenix, Ariz., and David L. Bahrs, Liverpool, N.Y., assignors to General Electric Company, a corporation of New York
Filed May 4, 1964, Ser. No. 364,558
Int. Cl. G06f *1/00, 7/00*
U.S. Cl. 340—172.5 11 Claims

ABSTRACT OF THE DISCLOSURE

Apparatus for employment with a data processing unit providing for repetitive execution of a plurality of operations affecting respective segments of the memory, such apparatus providing a record of the status of each operation; wherein there is provided a record item for each such operation, the record item comprising an address and a tally; and wherein each time the corresponding operation is executed the address and the tally of the record item are incremented to provide the addresses of a succession of locations in the corresponding memory segment and to maintain a historical record of the number of times the operation has been performed and the number of storage locations which have been affected.

This invention relates to information processing apparatus and more particularly to apparatus for processing at high speeds data received from a plurality of lower speed external devices.

In the processing of data, various arithmetic, logical, or data transfer operations are performed on data items by a data processing unit, the unit being adapted to execute a sequence of these operations in a very short period of time. Each data item comprises a plurality of data digits. To maintain a rapid rate of execution of these operations, the data processing unit must be able to obtain data items immediately when needed and to store the items immediately after processing. Rapid supply and storage of data items is provided by a high-speed random access memory.

The random access memory operates at a rate of speed compatible with that of the data processing unit, rapidly supplying a data item required by the data processing unit or rapidly storing a data item processed by the data processing unit. These data items are held in respective addressable storage locations in the memory and a data item is retrieved from or stored in a storage location identified by an address. Additionally, the random access memory holds in a group of storage locations thereof instructions for controlling the sequence of operations to be executed by the data processing unit. An instruction normally comprises a command portion for designating the specific type of arithmetic, logical or data transfer operation to be performed and an address portion identifying the storage location in the memory to be involved in the specific operation.

A data processing unit must frequently execute the same type of operation on the individual data items held in a series of sequentially addressable storage locations in the memory. Additionally, the data processing unit must often maintain a record of the number of times this type of operation has been executed in order that the operation affect only a predetermined number of data items, or in order to provide information that the operation has affected the contents of a complete group of successive storage locations.

Some prior art data processing units effect the aforementioned function by storing a separate instruction for each storage location in the group of locations on which the common operation is to be performed. However, such a system requires a large portion of the memory to be reserved for this set of instructions, thereby either requiring a larger memory for the data processing unit or limiting the amount of memory space available for data to be processed and for processed data.

Other prior art data processing units provide a common instruction, but increment the address portion of the instruction each time the instruction is executed. In this manner the command portion of the instruction performs the same operation on the contents of the succession of storage locations addressed by the repeatedly incremented address portion. However, many additional costly and time-consuming operations are performed by such a data processing unit each time the common instruction is executed to provide information as to the number of times this common instruction has been executed, so that employment of the instruction can be ceased or reactivation of the address portion may be provided when the contents of a predetermined number of storage locations have been operated on by the instruction. It is therefore desirable to provide apparatus for more effectively enabling a data processing unit to execute a common operation on the contents of a succession of memory storage locations and to maintain a record as to the number of times a particular instruction has been executed.

Therefore, it is an object of this invention to provide improved apparatus for executing a series of similar operations.

Another object of this invention is to provide apparatus for employment with a data processing unit for more effectively executing a common operation on each one of a group of data items and for maintaining a record of the number of times such operation has been executed.

Another object of this invention is to provide apparatus for employment with a data processing unit to provide rapidly operating, inexpensive, simple and reliable means for executing a common operation on data items in a sequence of memory storage locations, while maintaining a record of the number of times the operation has been executed.

The foregoing objects are achieved by providing a record item for an operation which is to be performed repetitively, the record item providing both the required succession of addresses and current information as to the number of times the operation has been executed. Each time the data processing unit is to execute the common operation, a specific instruction is retrieved from the memory. Execution of this instruction provides temporary storage of the command portion and retrieval of the corresponding record item from the memory. The record item comprises an address portion and a tally portion. Both the address portion and the tally portion are incremented. The operation designated by the command portion of the original instruction is now executed with respect to the storage location identified by the address portion of the record item. Thus, by successively incrementing the address and tally portions of a record item the common operation is executed on the contents of a group of storage locations at the same time that information as to the number of times the operation has been executed is maintained in a current status. Accordingly, the instant invention implements the requisite function by providing rapidly operating inexpensive, simple, and reliable apparatus.

DESCRIPTION OF DRAWINGS

This invention will be described with reference to the accompanying drawings wherein.

DATA PROCESSING SYSTEM—GENERAL

Figure 1:
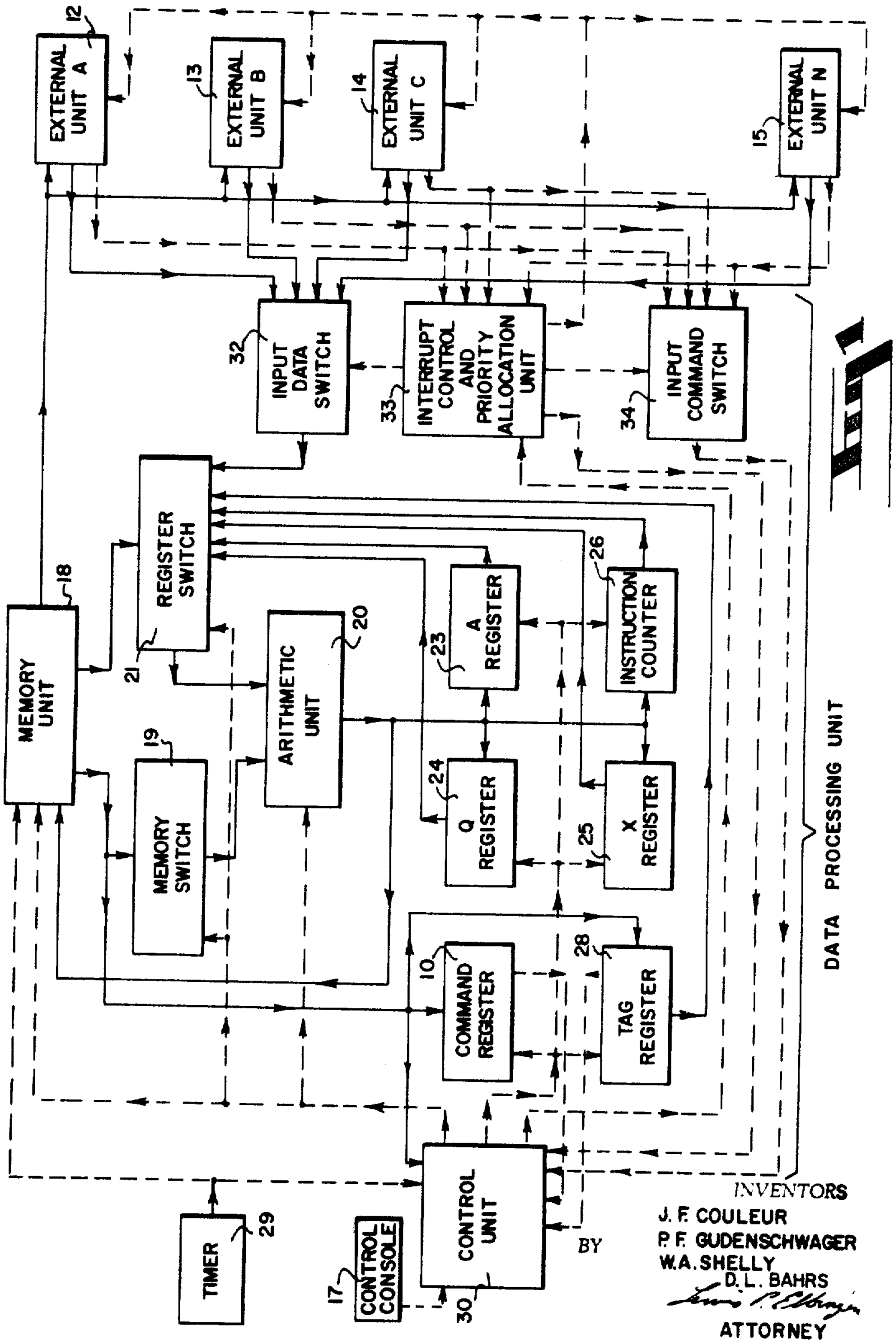
FIGURE 1 is a block diagram of a data processing system embodying the instant invention.

The Data Processing System of FIG. 1 is adapted to process data under the operational control of a Command Register 10 or one of a plurality of external data handling units, such as External Units 12, 13, 14 and 15. The lines interconnecting the various components illustrated in FIG. 1 symbolically represent paths of data and control communication. Thus, the solid lines represent paths of data communication between the components and the dashed lines represent paths for the transfer of control signals between the components.

The System responds to a plurality of distinct commands to execute a plurality of corresponding operations on data, these commands being supplied in sequential order to Command Register 10, or being supplied by each one of External Units 12–15. The portion of the Data Processing System of FIG. 1 directed to receiving data for processing, processing data, and transmission of processed data is identified herein as the Data Processing Unit. Thus, in FIG. 1, all components, except External Units 12–15, comprise the Data Processing Unit.

The Data Processing Unit comprises a Control Console 17, which provides an indicating and control station for the operator, whereby the operator is provided access to the System for modification of the order of execution of the commands or for revision of data. A Memory Unit 18 stores data items, such as operands which are to be processed, operands which are the result of processing, instructions and other control words for the control of the System by Command Register 10, and channel control words for control of the System by the External Units. The remainder of the System communicates with the Memory Unit to receive therefrom and transmit thereto these operands, instructions, and control words.

All operands received from Memory Unit 18 for processing are transferred through a Memory Switch 19 to an Arithmetic Unit 20. Memory Switch 19 transfers operands directly to Arithmetic Unit 20 or shifts the relative numerical position of the elements of the operands and then transfers the shifted elements to Arithmetic Unit 20. Register Switch 21 provides another source of data items for Arithmetic Unit 20. Register Switch 21 receives portions of data items from Memory Unit 18, data items from storage registers in the Data Processing Unit, and data items from the External Units. Arithmetic Unit 20 performs arithmetic operations, such as addition or subtraction, on the data received from Memory Switch 19 and Register Switch 21 and transmits the data results to Memory Unit 18 or to one of the storage registers.

The Data Processing Unit comprises five storage registers in addition to Command Register 10; namely, A Register 23, Q Register 24, X Register 25, Instruction Counter 26, and Tag Register 28. The A Register, the Q Register, and the X Register provide temporary storage for data items currently being processed. Instruction Counter 26 stores an identification of the Memory Unit location of the next instruction to be employed and is periodically incremented so that instructions may be received in sequence from Memory Unit 18. Registers 23, 24, 25, and 26 selectively receive data results from Memory Unit 18. Command Register 10 and Tag Register 28 provide temporary storage for respective portions of instructions received directly from Memory Unit 18. The contents of registers 23, 24, 25, 26 and 28 are selectively supplied to Register Switch 21.

A Timer 29 provides timing signals for timing the sequential execution of the individual steps in the operations performed by the System. A Control Unit 30 responds to signals provided by commands in Command Register 10 or to command signals provided by any one of External Units 12–15 for controlling the type of operation being executed by the System. Additionally, Control Unit 30 responds to the timing signals of Timer 29 for controlling the individual steps of each operation.

Data items to be processed by the Data Processing Unit are supplied by External Units 12–15. These External Units also receive and employ the data after it has been processed. The External Units may be, for example, magnetic tape handlers, punched card readers and punches, and electric typewriters. The External Units also may be remote stations in the System for supplying and receiving data. Data supplied by such remote External Units may include missile tracking information provided by a radar station or telemetry information representing, for example, the present conditions of a missile, such as velocity, temperature, and pressure.

Data items supplied by External Units 12–15 are transmitted to an Input Data Switch 32, which selects one of the External Units for transmission of its supplied data item through Register Switch 21, Arithmetic Unit 20, and into Memory Unit 18, Memory Unit 18 storing this data item for subsequent processing. An Interrupt Control and Priority Allocation Unit 33 receives control signals provided by the ones of External Units 12–15 currently demanding communication with the Data Processing Unit and controls Input Data Switch 32 to provide communication for the one of the External Units allocated highest priority.

Additionally, External Units 12–15 supply complete information for controlling the Data Processing Unit in its storage and processing of the data items received from the External Units and in its transmission of the processed data to the External Units. Accordingly, the External Units supply the identifications of Memory Unit locations to Input Data Switch 32 and supply command signals to Input Command Switch 34. Interrupt Control 33 also controls Input Command Switch 34 to transmit to Control Unit 30 the command signals provided by the highest priority External Unit currently demanding communication with the Data Processing Unit. Control Unit 30 responds to these command signals for controlling the handling and processing of the data items supplied by the corresponding External Unit.

Thus, the Data Processing System of FIG. 1, which embodies the instant invention, receives, processes, and transmits data under control of either a centrally located Command Register or any one of a plurality of external or remote data handling units.

For a complete description of the system of FIGURE 1 and of the instant invention which is embodied in such system, reference is made to United States Patent 3,298,001, issued to John F. Couleur et al., and assigned to the assignee of the present invention. More particularly, FIGURES 2–26 of the drawings, column 1, lines 12–56; column 4, lines 72–75; column 5, lines 1–58; column 7, lines 28–75; and columns 8–81 of United States Patent 3,298,001 are incorporated herein by reference and made a part of the instant patent application.

While the principles of the invention have now been made clear in an illustrative embodiment, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed is:

1. In a data processing system, the combination comprising: command executing means for executing a plurality of different operations on data in response to respective commands received thereby; a data storage member for storing a plurality of data items in a corresponding plurality of storage locations, a plurality of said data items being instruction data items and comprising an address, a command, and a test portion, one of said data items being a historical data item and comprising a record portion, said record portion representing a number for tallying the number of times an operation has been executed for one of said commands; first transfer means for performing a first transfer for retrieving one of said instruction data items from said storage member; means responsive to said first transfer for sensing the test portion of said retrieved data item and for delivering a retrieval signal if said test portion satisfies a predetermined criterion; second transfer means responsive to said retrieval signal for performing a second transfer for retrieving said one data item from said storage member; means responsive to said second transfer for incrementing said record portion by a predetermined amount; and means following said second transfer for supplying the command of said retrieved data item to said command executing means.

2. In a data processing system, the combination comprising: command executing means for executing a plurality of different operations on data received by said system; a data storage member for storing a plurality of data items in a corresponding plurality of storage locations, one of said data items comprising a control portion, an address portion, and a record portion, said address portion representing a number for identifying a corresponding one of said locations and said record portion representing a number for tallying the number of times a predetermined operation has been executed; a register for storing address data identifying one of said storage locations; a first transfer means for performing a first transfer for retrieving said one data item from said data storage member; testing means for testing the control portion of said one data item and for delivering a control signal when said control portion has a predetermined state; means responsive to said control signal for incrementing the address portion of said one data item by a first predetermined amount and for incrementing the record portion of said one data item by a second predetermined amount; second transfer means responsive to said control signal for performing a second transfer for transferring said incremented address portion to said register; and means responsive to said second transfer for controlling said command executing means to perform said predetermined operation with respect to the storage location identified by said register contents.

3. In a data processing system, the combination comprising: command executing means, when enabled, for executing a plurality of different operations on data received by said system, each of said operations being executed in response to a respective command received by said means; a data storage member for storing a plurality of data items in a corresponding plurality of storage locations, a plurality of said data items comprising an address portion and a command portion, one of said data items comprising an address portion and a record portion, said address portions representing a number for identifying a corresponding one of said locations and said record portion representing a number for tallying the number of times one of said command portions has been employed; a first register for storing address data identifying one of said storage locations; a second register for storing one of said data items; first transfer means responsive to the completion of each of said operations executed by said command executing means for performing a first transfer for transferring the data item in the storage location identified by said first register contents to said second register; second transfer means responsive to said first transfer for performing a second transfer for fied by said first register contents to said second register; to said first register and for transferring the command portion in said second register to said command executing means; third transfer means responsive to said second transfer for performing a third transfer for transferring said one data item in the storage location identified by said first register contents to said second register means responsive to said third transfer for incrementing the address portion in said second register by a first predetermined amount and for incrementing the record portion in said second register by a second predetermined amount; fourth transfer means responsive to said incrementation for performing a fourth transfer for transferring the incremented address portion in said second register to said first register; and means responsive to said fourth transfer for enabling said command executing means to perform an operation in response to said command portion with respect to the storage location identified by said first register contents.

4. In a data processing system, the combination comprising: command executing means, when enabled, for executing a plurality of different operations on data received by said system, each of said operations being executed in response to a respective command received by said means; a data storage member for storing a plurality of data items in a corresponding plurality of storage locations, a plurality of said data items comprising an address portion and a command portion, one of said data items comprising a control portion, an address portion, and a record portion, said address portions representing a number for identifying a corresponding one of said locations and said record portion representing a number for tallying the number of times one of said command portions has been employed; a first register for storing address data identifying one of said storage locations; a second register for storing one of said data items; first transfer means responsive to the completion of each of said operations executed by said command executing means for performing a first transfer for transferring the data item in the storage location identified by said first register contents to said second register; second transfer means responsive to said first transfer for performing a second transfer for transferring the addess portion in said second register to said first register and for transferring the command portion in said second register to said command executing means; third transfer means responsive to said second transfer for performing a third transfer for transferring the data item in the storage location identified by said first register contents to said second register; testing means for testing the control portion in the data item contents of said second register and for delivering a first control signal when said control portion has a predetermined state; means responsive to said first control signal for incrementing the address portion in said second register by a first predetermined amount and for incrementing the record portion in said second register by a second predetermined amount; fourth transfer means responsive to said first control signal for performing a fourth transfer for transferring the incremented address portion in said second register to said first register; and means responsive to said fourth transfer for enabling said command executing means to perform an operation in response to said command portion with respect to the storage location identified by said first register content.

5. In a data processing system, the combination comprising: command executing means, when enabled, for executing a plurality of different operations on data received by said system, each of said operations being executed in response to a respective command received by said means; a data storage member for storing a plurality of data items in a corresponding plurality of storage locations, a plurality of said data items comprising an address portion and a command portion, one of said data items comprising a control portion, an address portion, and a record portion, said address portions representing a number for identifying a corresponding one of said locations and said record portion representing a number for tallying the number of times one of said command portions has been employed; a first register for storing address data identifying one of said storage locations; a second register for storing one of said data items; first transfer means responsive to the completion of each of said operations executed by said command executing means for performing a first transfer for transferring the data item in the storage location identified by said first register contents to said second register; second transfer means responsive to said first transfer for performing a second transfer for transferring the address portion in said second register to said first register and for transferring the command portion in said second register to said command executing means; third transfer means responsive to said second transfer for performing a third transfer for transferring to the data item in the storage location identified by said first register contents to said second register; testing means for testing the control portion in the data item contents of said second register and for delivering a first control signal when said control portion has a predetermined state; means responsive to said first control signal for incrementing the address portion in said second register by a predetermined amount and for incrementing the record portion in said second register by said predetermined amount; fourth transfer means responsive to said first control signal for performing a fourth transfer for transferring the incremented address portion in said second register to said first register; and means responsive to said fourth transfer for enabling said command executing means to perform an operation in response to said command portion with respect to the storage location identified by said first register contents.

6. In a data processing system, the combination comprising: command executing means, when enabled, for executing a plurality of different operations on data received by said system, each of said operations being executed in response to a respective command received by said means; a data storage member for storing a plurality of data items in a corresponding plurality of storage locations, a plurality of said data items comprising an address portion and a command portion, one of said data items comprising a control portion, an address portion, a first record portion and a second record portion, said address portions representing a number for identifying a corresponding one of said locations, said first record portion representing a number for tallying the number of storage locations with respect to which one of said command portions has been employed, and said second record portion representing a number for tallying the number of times said one command portion has been employed with respect to a particular storage location; a first register for storing address data identifying one of said storage locations; a second register for storing one of said data items; first transfer means responsive to the completion of each of said operations executed by said command executing means for performing a first transfer for transferring the data item in the storage location identified by said first register contents to said second register; second transfer means responsive to said first transfer for performing a second transfer for transferring the address portion in said second register to said first register and for transferring the command portion in said second register to said command executing means; third transfer means responsive to said second transfer for performing a third transfer for transferring the data item in the storage location identified by said first register contents to said second register; testing means for testing the control portion in the data item contents of said second register and for delivering a first control signal when said control portion has a predetermined state; means responsive to said first control signal for incrementing the second record portion in said second register by a first predetermined amount, means responsive to said first control signal and to a predetermined state of said second record portion for incrementing the address portion in said second register by a second predetermined amount and for incrementing the first record portion in said second register by a third predetermined amount; fourth transfer means responsive to said first control signal for performing a fourth transfer for transferring the address portion in said second register to said first register; and means responsive to said fourth transfer for enabling said command executing means to perform an operation in response to said command portion with respect to the storage location identified by said first register contents.

7. In a data processing system, the combination comprising: command executing means, when enabled, for executing a plurality of different operations on a data received by said system, each of said operations being executed in response to a respective command received by said means; a data storage member for storing a plurality of data items in a corresponding plurality of storage locations, a plurality of said data items comprising an address portion and a command portion, one of said data items comprising a control portion, an address portion, a first record portion, and a second record portion, said address portions representing a number for identifying a corresponding one of said locations, said first record portion representing a number for tallying the number of storage locations with respect to which one of said command portions has been employed, and said second record portion representing a number for tallying the number of times said one command portion has been employed with respect to a particular storage location; a first register for storing address data identifying one of said storage locations; a second register for storing one of said data items; first transfer means responsive to the completion of each of said operations executed by said command executing means for performing a first transfer for transferring the data item in the storage location identified by said first register contents to said second register; second transfer means responsive to said first transfer for performing a second transfer for transferring the address portion in said second register to said first register and for transferring the command portion in said second register to said command executing means; third transfer means responsive to said second transfer for performing a third transfer for transferring the data item in the storage location identified by said first register contents to said second register; testing means for testing the control portion in the data item contents of said second register and for delivering a first control signal when said control portion has a predetermined state; means responsive to said first control signal for incrementing the second record portion in said second register by a first predetermined amount, means responsive to said first control signal and to a predetermined state of said second record portion for incrementing the address portion in said second register by a second predetermined amount and for incrementing the first record portion in said second register by a third predetermined amount; fourth transfer means responsive to said first control signal for performing a fourth transfer for transferring the address portion in said second register to said first register; means responsive to said fourth transfer for enabling said command executing means to perform an operation in response to said command portion with respect to a predetermined portion of the storage location identified by said first register contents, and means responsive to said fourth transfer for shifting the contents of the storage location identified by said first register contents by a predetermined amount.

8. In a data processing system, the combination comprising: command executing means for executing a plurality of different operations on data received by said system; a data storage member for storing a plurality of data items in a corresponding plurality of storage locations, one of said data items comprising an address portion and a record portion, said record portion representing a number for tallying the number of times a predetermined operation has been executed; transfer means for performing a transfer for retrieving said one data item from said data storage member; means following said transfer for incrementing said record portion by a first predetermined amount and said address portion by a second predetermined amount; and means responsive to said transfer for controlling said command executing means to perform said predetermined operation with respect to a storage location determined by said address portion.

9. In a data processing system, the combination comprising: command executing means for executing a plurality of different operations on data in response to respective commands received thereby; a data storage member for storing a plurality of data items in a corresponding plurality of storage locations, a plurality of said data items being instruction data items and comprising an address, a command, and a test portion, one of said data items being a historical data item and comprising an address portion and a record portion, said record portion representing a number for tallying the number of times an operation has been executed for one of said command portions; first transfer means for performing a first transfer for retrieving one of said instruction data items from said storage member; means responsive to said first transfer for sensing the test portion of said retrieved data item and for delivering a retrieval signal if said test portion satisfies a predetermined criterion; second transfer means responsive to said retrieval signal for performing a second transfer for retrieving said one data item from said storage member; means responsive to said second transfer for incrementing said record portion by a first predetermined amount and said address portion by a second predetermined amount; and means following said second transfer for supplying the command of said retrieved data item to said command executing means for controlling said command executing means to perform an operation with respect to a storage location determined by said address portion.

10. In a data processing system, the combination comprising: command executing means for executing a plurality of different operations on data received by said system; a data storage member for storing a plurality of data items in a corresponding plurality of storage locations, one of said data items comprising a control portion, an address portion, and a record portion, said address portion representing a number for identifying a corresponding one of said locations and said record portion representing a number for tallying the number of times a predetermined operation has been executed; a register for storing address data identifying one of said storage locations; a first transfer means for performing a first transfer for retrieving said one data item from said data storage member; testing means for testing the control portion of said one data item and for delivering a control signal when said control portion has a predetermined state; means responsive to said control signal for incrementing the address portion of said one data item by a first predetermined amount and for incrementing the record portion of said one data item by a second predetermined amount; second transfer means responsive to said control signal for performing a second transfer for transferring said address portion to said register; and means responsive to said second transfer for controlling said command executing means to perform said predetermined operation with respect to the storage location identified by said register contents.

11. In a data processing system, the combination comprising: command executing means, when enabled, for executing a plurality of different operations on data received by said system, each of said operations being executed in response to a respective command received by said means; a data storage member for storing a plurality of data items in a corresponding plurality of storage locations, a plurality of said data items comprising an address portion and a command portion, one of said data items comprising an address portion and a record portion, said address portion representing a number for identifying a corresponding one of said locations and said record portion representing a number for tallying the number of times one of said command portions has been employed; a first register for storing address data identifying one of said storage locations; a second register for storing one of said data items; first transfer means responsive to the completion of each of said operations executed by said command executing means for performing a first transfer for transferring the data item in the storage location identified by said first register contents to said second register; second transfer means responsive to said first transfer for performing a second transfer for transferring the address portion in said second register to said first register and for transferring the command portion in said second register to said command executing means; third transfer means responsive to said second transfer for performing a third transfer for transferring said one data item in the storage location identified by said first register contents to said second register; means responsive to said third transfer for incrementing the address portion in said second register by a first predetermined amount and for incrementing the record portion in said second register by a second predetermined amount; fourth transfer means for performing a fourth transfer for transferring the address portion in said second register to said first register; and means responsive to said fourth transfer for enabling said command executing means to perform an operation in response to said command portion with respect to the storage location identified by said first register contents.

References Cited

UNITED STATES PATENTS 3,226,691 12/1965 Hazard ---------- 340—172.5

ROBERT C. BAILEY, Primary Examiner

G. D. SHAW, Assistant Examiner